United States Patent [19]

Le Noane et al.

[11] Patent Number: 5,155,789
[45] Date of Patent: Oct. 13, 1992

[54] OPTICAL FIBER TELECOMMUNICATIONS CABLE

[75] Inventors: Georges Le Noane, Tregastel; Philippe Cheron, St. Ange Le Vieil; Patrick Jamet, Maroles Sur Seine; Philippe Trombert, Fericy, all of France

[73] Assignees: Societe Industrielle De Liaisons Electriques Silec, Paris; ETAC Francais (Centre National d'Etude des Telecommunications-CNET), Issy les Moulineaus, both of France

[21] Appl. No.: 734,696

[22] Filed: Jul. 23, 1991

[30] Foreign Application Priority Data

Jul. 27, 1990 [FR] France .................. 90 09627

[51] Int. Cl.$^5$ .............................................. G02B 6/44
[52] U.S. Cl. ...................................... 385/106; 385/102
[58] Field of Search ............... 385/102, 104, 105, 106, 385/110, 111, 112

[56] References Cited

U.S. PATENT DOCUMENTS

| 4,212,097 | 7/1980 | Portinari et al. ..................... 385/109 |
| 4,230,395 | 10/1980 | Dean et al. ....................... 385/112 X |
| 4,312,566 | 1/1982 | Jackson ........................... 385/112 X |
| 4,822,132 | 4/1989 | Oestreich ........................... 385/112 |
| 4,898,451 | 2/1990 | Story ............................... 385/106 |
| 4,906,067 | 3/1990 | Mayr et al. ...................... 385/112 X |
| 4,909,593 | 3/1990 | Harbort et al. .................. 385/112 X |
| 4,932,746 | 6/1990 | Calzolari et al. .................... 385/112 |
| 4,936,651 | 6/1990 | Tani ................................... 385/109 |
| 4,964,691 | 10/1990 | Nelson et al. ........................ 385/113 |
| 5,062,685 | 11/1991 | Cain et al. ............................ 385/102 |
| 5,067,830 | 11/1991 | McAlpine et al. ................... 385/106 |
| 5,087,110 | 2/1992 | Inagaki et al. ...................... 385/112 |

FOREIGN PATENT DOCUMENTS 1483845 8/1977 United Kingdom ........... 385/102 X

Primary Examiner—Brian Healy
Attorney, Agent, or Firm—Griffin, Branigan & Butler

[57] ABSTRACT

The telecommunications cable of the invention comprises a series of optical fibers which are preferably coated with respective colored identification layers, the fibers being split into modules each of which is enveloped by a thin supporting sheath that is easily torn, with different sheaths preferably being of different colors, the sheaths being in contact with the optical fibers, and a protective covering being in contact with the supporting sheaths.

10 Claims, 1 Drawing Sheet

U.S. Patent
Oct. 13, 1992
5,155,789
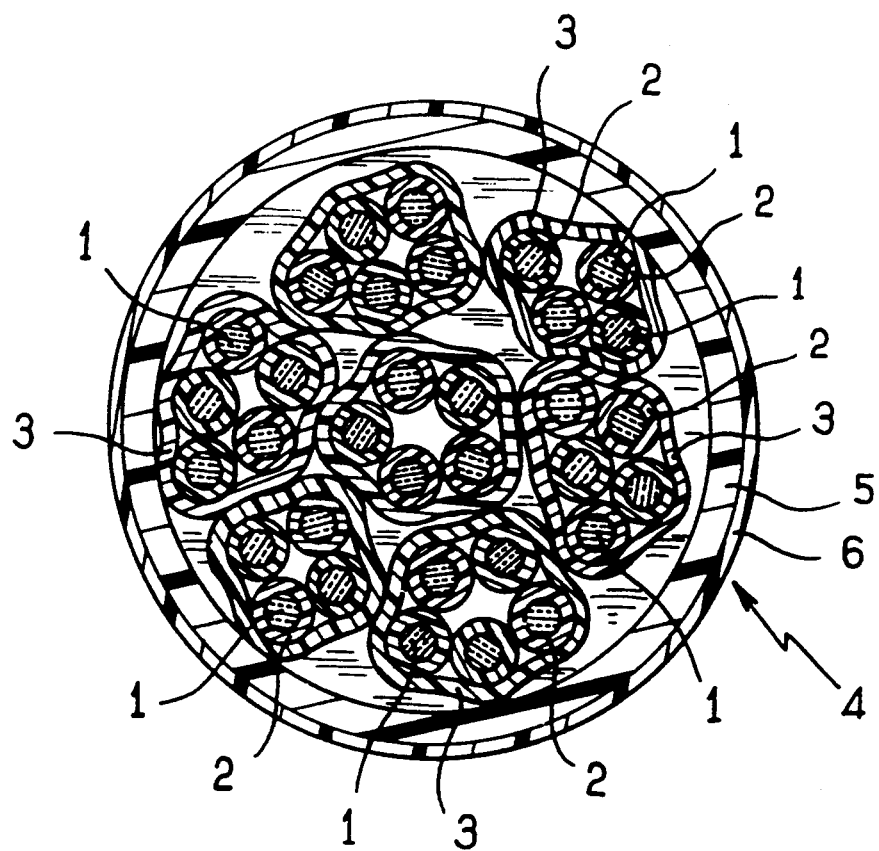

OPTICAL FIBER TELECOMMUNICATIONS CABLE

The present invention relates to an optical fiber telecommunications cable, and more particularly but not exclusively to a monomode fiber telecommunications cable for use in local networks.

BACKGROUND OF THE INVENTION

Telecommunications cables are known that comprise a series of optical fibers disposed in a protective sheath. In order to protect optical fibers against micro-bending which generally gives rise to a loss of optical fiber transmission properties, particularly in multimode fibers, it is known, in particular from Document EP-A-321,788, to provide optical fiber cables with a carrier member, generally a reinforcing component surrounded by a series of tubes or by a grooved cylindrical rod. The optical fibers are disposed loosely in the tubes or in the grooves of the cylindrical rod so that the optical fibers are subjected to practically no stress even when the cable is subjected to significant traction or to changes in temperature. The decoupling between the load-carrying structure of the cable and the optical fibers also provides resistance to shock and to crushing.

However, cables of this type are expensive and they are bulky compared with the number of optical fibers that they contain. These drawbacks are incompatible with the conditions in which optical fibers, and in particular monomode optical fibers, are used in local networks where it is desirable to have a very high connection density at low cost with respect both to purchasing and to laying optical fiber cables.

SUMMARY OF THE INVENTION

The present invention provides a telecommunications cable comprising a series of optical fibers disposed in a covering and split into modules, each module being enveloped in a thin supporting sheath that is easily torn, wherein the supporting sheaths are in contact with the optical fibers to clamp them together, and wherein the covering is in contact with the module-supporting sheaths to constitute an assembly that is compact.

It has been observed that it is possible to associate a plurality of optical fibers inside the same supporting sheath disposed directly on the set of fibers without any decoupling and without degrading the transmission properties thereof, with the sole function of the sheath being to ensure cohesion of the module with a high degree of compactness, while allowing fibers to be stripped quickly on site for connection to a user equipment or for interconnection between cables. In addition, the covering disposed in direct contact with the assembly of modules also contributes to making a cable that is dense and serves to confer mechanical characteristics on the cable that are sufficient and suitable for the uses to which the cable is put, given its small size and low weight.

In an advantageous version of the invention, the optical fibers are coated with respective colored identification layers. The fibers are thus individually marked to enable them to be connected to a user equipment.

According to another advantageous aspect of the invention, the module-supporting sheaths are of different colors from one another. It it thus easy to identify a module for connection to a particular subassembly.

BRIEF DESCRIPTION OF THE DRAWING

An embodiment of the invention is described by way of example with reference to the accompanying drawing, in which the sole figure is a highly magnified cross-section view through a cable of the invention.

DETAILED DESCRIPTION

With reference to the FIGURE, a telecommunications cable of the invention comprises a series of optical fibers 1 each coated with a colored identification layer 2. The series of optical fibers 1 is split into modules which comprise four or five optical fibers each in the example shown. Each module is enveloped in a supporting sheath 3 that is thin and easy to tear. Each supporting sheath 3 comes into contact with the optical fibers constituting the module and serves to hold them together.

The sheaths 3 are adapted to the characteristics of the materials from which the optical fibers are made so as to clamp them together in such a way that the expansion and contraction forces due to changes in temperature are much less than the stresses which would lead to the optical fibers being degraded. For example, the supporting sheaths 3 may be made of polyethylene, polypropylene, polyamides, or other materials which are preferably extruded onto a module of fibers simultaneously with the fibers being drawn and assembled together. The supporting sheath 3 is constituted by a colored layer of thickness lying in the range a few thousandths of a millimeter to a few tenths of a millimeter and preferably lying in the range one-hundredth of a millimeter to one-tenth of a millimeter. The optical fibers are thus protected from contact with the ambient medium and from mechanical attacks of small magnitude. Because the supporting sheath 3 is thin, the fibers 1 are not subjected to elongation and compression stresses during thermal cycling and manufacture can be performed cheaply, particularly if the sheath is made in the same manufacturing operation as that of drawing the optical fibers constituting the module, by using a technique of the in-line multifiber cabling type.

The module obtained in this way is very compact and it facilitates cable connection by providing simple identification, ease of stripping, suitability for handling, and flexibility all of which are highly favorable for the internal organization of connection boxes which can therefore be optimized in size and cost.

The set of modules 3 is covered by a covering 4 in contact with the module-supporting sheaths 3 to form a compact assembly. The covering 4 is advantageously constituted by a preferably-extruded first layer 5 of material having a low coefficient of expansion, a low relaxation effect, and high mechanical strength given by a high modulus of elasticity, and covered by a second layer 6 whose function is to determine the final appearance of the cable and its abrasion resistance, and to reduce its coefficient of friction so as to minimize forces while the cable is being laid in tubular ducting. If so desired, the gaps between the modules 3 and the covering 4 may be filled with a sealant, as may be the gaps between the fibers inside a supporting sheath.

It may be observed that the cable of the invention is particularly compact and contains a large number of optical fibers in a very small space. In addition, its manufacturing cost is very low because of the presently-available facilities for extruding the modules and the covering at very high speed. In this context, although extrusion is the recommended method of forming the modules, it would also be possible to make the supporting sheath 3 by soaking and smoothing in a die and then cross-linking the protective material by radiation, or by irradiation, or by evaporation of a solvent.

Naturally the invention is not limited to the embodiment described, and variant embodiments may be implemented without going beyond the scope of the invention. In particular, the fibers within a supporting sheath 3 and the modules within the covering 4 may be assembled without being twisted, may be assembled with twisting at a continuous pitch; or may be assembled with twisting at an alternating pitch.

Although the supporting sheaths are shown in the embodiment described as having constant thickness, the supporting sheath material may extend between the fibers to obtain more intimate contact, and indeed the optical fibers may be completely embedded in the material constituting the supporting sheath.

We claim:

1. A telecommunications cable comprising:
   (1) a plurality of optical fibers constituting a module of fibers;
   (2) a thin supporting sheath enveloping the module of fibers to form a sheath-supported module, wherein each outer fiber in the module is in contact with the sheath such that the sheath clamps the fibers together, and wherein the sheath is easily torn; and
   (3) a covering enveloping a plurality of sheath-supported modules such that the covering is in contact with the sheath-supported module so as to constitute a compact assembly of the optical fibers.

2. A telecommunications cable according to claim 1, wherein the supporting sheaths are made simultaneously with operations of drawing the optical fibers, and of assembling them together.

3. A telecommunications cable according to claim 1, wherein the supporting sheaths of different sheath-supported modules are of different colors.

4. A telecommunications cable according to claim 1, wherein the supporting sheaths are installed on the modules of fibers by extrusion.

5. A telecommunications cable according to claim 1, wherein the optical fibers are coated with respective colored identification layers.

6. A telecommunications cable according to claim 1, wherein a sealant is disposed inside the sheath-supported modules.

7. A telecommunications cable according to claim 1, wherein a sealant is disposed inside the covering and between the sheath-supported modules.

8. The telecommunications cable according to claim 1, wherein the supporting sheath is made of a plastic.

9. The telecommunications cable according to claim 8, wherein the plastic is polyethylene, polypropylene or polyamides.

10. The telecommunications cable according to claim 1, wherein the cable is unreinforced.

* * * * *